United States Patent
Pitzer et al.

(10) Patent No.: US 7,093,802 B2
(45) Date of Patent: Aug. 22, 2006

(54) PRESSURIZED SONOBUOY DEPLOYMENT SYSTEM

(75) Inventors: Jon W. Pitzer, Kent, WA (US); Mark Olsen, North Bend, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/966,201

(22) Filed: Oct. 15, 2004

(65) Prior Publication Data

US 2006/0102792 A1    May 18, 2006

(51) Int. Cl.
*B64D 1/02* (2006.01)

(52) U.S. Cl. .............................. 244/137.1; 244/137.4; 89/1.54; 89/1.59; 89/1.8

(58) Field of Classification Search ............. 244/137.1, 244/137.4, 118.1; 89/33.02, 1.51, 1.52, 1.54, 89/1.55, 1.58, 1.59, 45, 1.801, 1.8, 1.802, 89/1.805, 1.815, 1.816, 36.08, 1.819; 124/75; 221/153, 250, 231, 224, 289, 295; 367/3–5
See application file for complete search history.

(56) References Cited

U.S. PATENT DOCUMENTS

| | | | | |
|---|---|---|---|---|
| 3,216,322 A | * | 11/1965 | Wenger et al. ............... 89/1.59 |
| 4,040,334 A | * | 8/1977 | Smethers, Jr. ............. 89/1.804 |
| 4,637,292 A | * | 1/1987 | Peterson .................... 89/1.804 |
| 4,681,013 A | * | 7/1987 | Farley et al. ............... 89/1.815 |
| 4,962,798 A | * | 10/1990 | Ferraro et al. ........... 244/137.1 |
| 4,974,796 A | | 12/1990 | Carr et al. |
| 5,365,913 A | * | 11/1994 | Walton ........................ 124/75 |
| 6,679,454 B1 | * | 1/2004 | Olsen et al. ............. 244/137.1 |

* cited by examiner

*Primary Examiner*—Galen Barefoot
(74) *Attorney, Agent, or Firm*—Shimokaji & Associates, P.C.

(57) ABSTRACT

A jet aircraft with integrated, rotary sonobuoy launch system has storage racks for a number of sonobuoys in sonobuoy launch containers; and one or more launcher units in its cabin. Each launcher unit has a pressure shell with a door allowing loading of sonobuoys in sonobuoy launch containers from the storage racks. With the door closed, the inside of the shell can be depressurized for launching a sonobuoy by opening a gate valve that connects the interior of the shell to the exterior of the aircraft. With the gate valve closed, the shell can pressurized so that the door can be opened and sonobuoys reloaded. A control system can be used to rotate a rotary launcher inside each pressure shell so that a selected sonobuoy is moved to a launch position above the gate valve and a launch tube, and a pneumatic system can be used to launch the sonobuoy.

30 Claims, 9 Drawing Sheets

PRESSURIZED SONOBUOY DEPLOYMENT SYSTEM

GOVERNMENT RIGHTS

This invention was made with Government support. The Government has certain rights in this invention.

BACKGROUND OF THE INVENTION

The present invention generally relates to launching stores from flying vehicles and, more particularly, to launching sonobuoys from aircraft.

A number of different types of dispensers and launchers exist for deployment of sonobuoys from aircraft, such as airplanes and helicopters. Sonobuoys are often deployed into the ocean to aid in the detection of vessels, such as submarines, and may have military as well as other uses. Sonobuoys may be equipped to use echo location, for example, or to detect noise generated by a vessel, and precise determination of location may be facilitated by deploying a number of sonobuoys within a prescribed distance and time period.

A number of different mechanisms have been used for implementing sonobuoy release from the launcher including, for example, cartridge activated devices (CAD), spring-loaded, mechanical ejectors, and gravity release. Each type of mechanism may be subject to its own unique constraints. For example, CADs are explosive devices that may require special precautions for handling by personnel, and gravity release mechanisms may only be appropriate for use with a slow flying aircraft or helicopter, for example, due to concerns of proper sonobuoy separation from the aircraft. Release of sonobuoys from higher altitudes may present problems in deploying sonobuoys from pressurized aircraft. Also, different workload issues may be presented in loading sonobuoys in a launcher depending on the type and configuration of the launcher. Differences also exist as to whether sonobuoys are deployed within their sonobuoy launch container (SLC) or whether the sonobuoy is removed from the SLC prior to being loaded into the dispenser or launcher. Again, each approach may be subject to distinct considerations. For example, while removing the sonobuoys from their SLCs may advantageously reduce payload weight on the aircraft, keeping sonobuoys in their SLCs may prolong "shelf life" of the sonobuoys to provide economic and mission flexibility advantages.

A radial sonobuoy launcher is disclosed in U.S. Pat. No. 6,679,454, assigned to the assignee of the present invention and fully incorporated herein by reference. A sonobuoy dispenser that uses gravity drop release suited to low speed deployment—such as from a helicopter—and requires removal of the sonobuoys from their SLCs and low altitude release is disclosed in U.S. Pat. No. 4,974,796 and fully incorporated herein by reference.

As can be seen, there is a need for deploying sonobuoys from aircraft at any altitude including high altitudes, deploying sonobuoys from a pressurized aircraft, and deploying sonobuoys from an aircraft at any speed. There is also a need for minimizing crew workload loading sonobuoys, providing storage that provides mission flexibility and providing a system that does not degrade sonobuoy life.

SUMMARY OF THE INVENTION

In one embodiment of the present invention, an aircraft stores launch system includes a dome structure having a door. The dome structure provides a pressure boundary between a cavity inside the dome structure and a cabin outside the dome structure when the door is closed. A gate valve connects the cavity to the exterior of the aircraft. The cavity is depressurized when the door is closed and the gate valve is opened and a stores launcher is operated inside the dome structure. A pneumatic system connected to the stores launcher forces a store from the stores launcher out of the aircraft.

In another embodiment of the present invention, a sonobuoy launch system includes a pressure dome having a door. When the door is closed the pressure dome maintains a pressure difference between a cabin pressure outside the pressure dome and an ambient pressure inside the pressure dome. A gate valve in a floor under the pressure dome allows the pressure difference to be reduced when the gate valve is closed and allows the cabin pressure to be maintained inside the pressure dome so that the door can be opened. A rotary launcher inside the pressure dome rotates a sonobuoy into a loading position and sonobuoys are loaded while the gate valve is closed and the door is open. A pneumatic system connected to the rotary launcher forces the sonobuoy from its SLC when the gate valve is open and the door is closed.

In still another embodiment of the present invention, an automated, rotary sonobuoy launch system includes a pressure shell having a door. The pressure shell provides a pressure boundary between a cavity inside the pressure shell and an aircraft cabin outside the pressure shell. When the door is closed, the pressure shell maintains a pressure difference between a cabin pressure outside the pressure shell and an ambient pressure inside the pressure shell. A gate valve is disposed in a floor under the pressure shell and connects the cavity to the exterior of the aircraft. When the door is closed and the gate valve is opened the cavity is depressurized to the ambient pressure so that the pressure difference is present across the pressure shell but not across the gate valve, and when the gate valve is closed it allows the cavity to be pressurized to the cabin pressure so that the pressure difference is reduced and the door can be opened. A rotary launcher inside the pressure shell rotates a sonobuoy into a position for installation of sonobuoys into the rotary launcher and into a launch position above said gate valve for launching the sonobuoy.

In yet another embodiment of the present invention, a jet aircraft with integrated rotary sonobuoy launch system includes: a cabin; storage racks in the cabin that store a number of sonobuoys in sonobuoy launch containers; and at least one automated, rotary sonobuoy launcher unit in the cabin. The automated, rotary sonobuoy launcher unit has a door that allows loading of sonobuoys from the sonobuoys in sonobuoy launch containers in the storage racks. The automated, rotary sonobuoy launcher unit includes a pressure shell that when the door is closed provides a pressure boundary between pressure in a cavity inside the pressure shell and a cabin pressure outside the pressure shell. The automated, rotary sonobuoy launcher unit also includes a gate valve in a floor under the pressure shell that connects the cavity to an exterior of the aircraft. When the door is closed and the gate valve is opened the cavity is depressurized to ambient pressure outside the aircraft so that a sonobuoy can be launched, and when the gate valve is closed the cavity can be pressurized to the cabin pressure so that the door can be opened and the sonobuoys can be loaded from the storage racks. A rotary launcher inside the pressure shell rotates a sonobuoy into a launch position above the gate valve and a launch tube leading to the exterior of the aircraft.

In a further embodiment of the present invention, a modified transport aircraft with a cabin includes storage racks in the cabin that store multiple sonobuoys in sonobuoy launch containers and a number of automated, rotary sonobuoy launcher units in the cabin. Each of the automated, rotary sonobuoy launcher units has a door that allows loading of sonobuoys from the sonobuoys in sonobuoy launch containers in the storage racks. Each of the automated, rotary sonobuoy launcher units includes: a pressure shell that when the door is closed provides a pressure boundary between pressure in a cavity inside the pressure shell and a cabin pressure outside the pressure shell. A gate valve in a floor under the pressure shell and connecting the cavity to an exterior of the aircraft is disposed so that when the door is closed and the gate valve is opened the cavity is depressurized to ambient pressure outside the aircraft so that a sonobuoy can be launched. When the gate valve is closed the cavity can be pressurized to the cabin pressure so that the door can be opened and the sonobuoys can be loaded from the storage racks. A rotary launcher inside the pressure shell rotates a sonobuoy into a launch position above the gate valve and a launch tube leading to the exterior of the aircraft. A pneumatic system and control system connected to the automated, rotary sonobuoy launcher units is configured so that sonobuoys from each of the plurality of automated, rotary sonobuoy launcher units can be individually and selectively launched.

In a still further embodiment of the present invention, a method of launching sonobuoys includes the operations of: loading a rotary launcher with sonobuoys through a door in a pressure dome; closing the door and opening a gate valve at a floor above a launch tube to depressurize the inside of the pressure dome; and launching a sonobuoy using a pneumatic system.

These and other features, aspects and advantages of the present invention will become better understood with reference to the following drawings, description and claims.

DETAILED DESCRIPTION OF THE INVENTION

Figure 1:
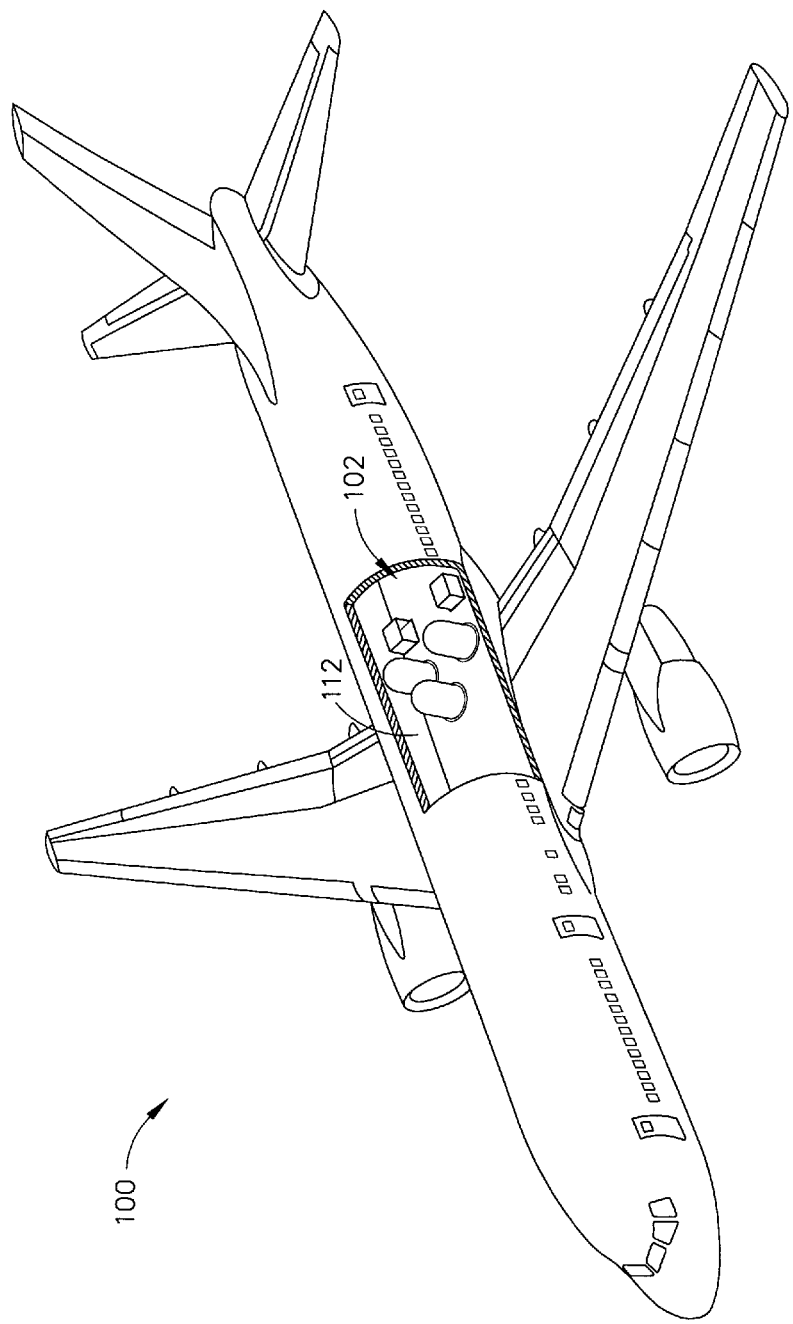
FIG. 1 is a cut-away perspective view of a modified transport aircraft, according to one embodiment of the present invention, incorporating a sonobuoy storage and launch system in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an aircraft and integrated system for launching stores from the aircraft, which may be, for example, a modified jet transport aircraft. The system may also be useful as well for slower, lower flying aircraft and helicopters. The stores may include a variety of devices, for example, chaff buoys, munitions, and marker buoys. A major application, however, is to the launching of sonobuoys, and sonobuoys are referred to throughout as the primary illustrative example without any intended loss of generality. One embodiment of the present invention provides a comprehensive, integrated system for launching large numbers of sonobuoys within rigorous time and space constraints from high altitude, high speed aircraft, providing proper sonobuoy separation from the aircraft under the extreme release conditions and without loss of cabin pressure. For example, an aircraft according to one embodiment can carry in excess of 100 sonobuoys. Pressurized launches can be performed above 10,000 feet, with pressurized launch of 36 sonobuoys (when three 12 unit launchers are installed) with minimal spacing which is the function of the speed the launchers can rotate and be ready to launch the next sonobuoy, or collocating 3 sonobuoys, simultaneously launched, or collocating more sonobuoys if there are more launchers installed.

In one embodiment, keeping the sonobuoys in their sonobuoy launch containers (SLC) until they are launched helps prevent degradation of sonobuoy life and helps to minimize crew workload in reloading launchers as well as facilitating reloading sonobuoys from storage while in flight, increasing mission flexibility. For example, keeping the sonobuoy in a hermetically sealed environment of the SLC may extend its shelf life to 5 years versus 90 days after removal from the SLC. Mission flexibility may be further increased by automated control which allows an operator to select the particular sonobuoy to be launched. For example, a rotary rack may be rotated until the selected sonobuoy is in the launch position.

One embodiment differs from the prior art in that sonobuoys while being loaded into a launcher can be loaded at cabin pressure into a chamber through an open door large enough to allow access to multiple sonobuoys at one time. The sonobuoys need not be removed from their sonobuoy launch containers, so that removing an empty SLC and reloading a full SLC containing a sonobuoy can take only a matter of seconds for each one compared to prior art launchers where each of which operation takes about a minute. Reloading 36 sonobuoys (the total capacity of three rotary launcher units as described above) can take only a few minutes using the inventive system while a prior art launcher requiring removal of the sonobuoys from their sonobuoy launch containers would typically take at least a half hour.

The door may then be closed and a gate valve opened, depressurizing the chamber without compromising cabin pressure so that the entire dispenser full of sonobuoys may then be at outside pressure within the chamber so that there is no pressure transition from inside the chamber to outside the aircraft. Each sonobuoy can now be individually launched, for example, from a launch tube through the aircraft skin without having to cross a pressure transition at a pressure boundary (the skin), yet the sonobuoys can be launched from a pressurized aircraft without disturbing cabin pressure. Unlike the prior art, neither the door nor the gate valve needs to be located near nor attached to a surface of the aircraft. Thus, sonobuoys can be launched from high altitudes and can be more forcibly ejected using, for example, pneumatic ejection rather than simple mechanical release, spring loaded, or gravity drops required by other prior art dispensers. More forcible ejection improves separation from the aircraft and thus, for example, improves launch reliability. In addition, using pneumatics has an advantage over using cartridge activated devices (CADs), which are explosive devices and thus inherently hazardous, in that no CADs are required on the main deck of the aircraft.

Referring now to the figures, FIG. 1 shows a jet aircraft 100 with an integrated sonobuoy launch system 102 in accordance with one embodiment of the present invention. A sonobuoy launch system 102 according to one embodiment may also be integrated, for example, into a modified transport aircraft. Integrated sonobuoy launch system 102, shown in more detail in FIG. 1A, may include sonobuoy storage racks 104, which may each hold, for example, about 42 sonobuoys in their sonobuoy launch containers—SLC 105.

Figure 2:
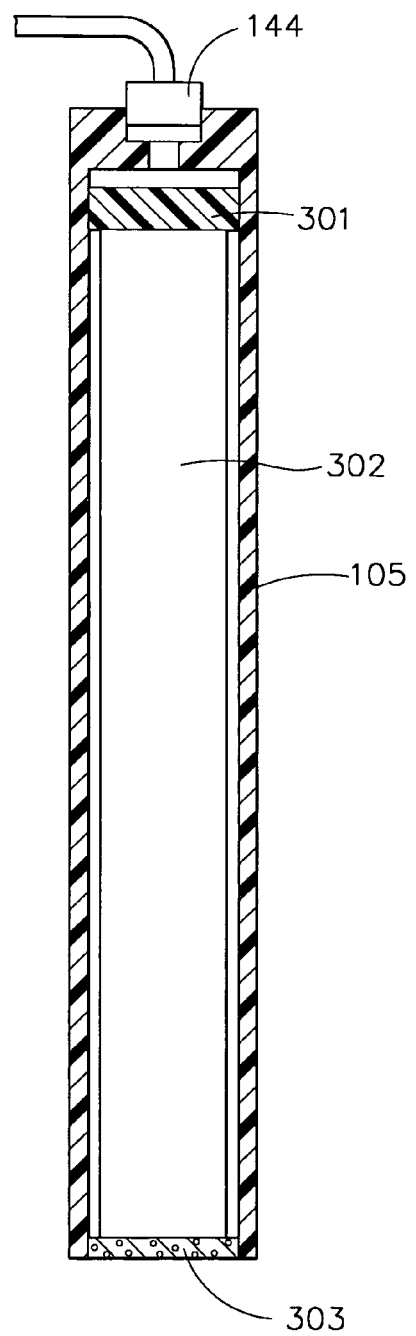
FIG. 2 is a cross sectional diagram of a sonobuoy launch container showing a sonobuoy inside, according to an embodiment of the present invention.

As seen in FIG. 2, an SLC 105 may contain a sonobuoy 302 sealed within SLC 105 by a frangible seal 303. SLC 105 may also contain a movable piston 301 and may be connected by a pneumatic connector 144 to a source of gas pressure so that when provided, pressure may move piston 301, pushing sonobuoy 302, breaking frangible seal 303, and ejecting sonobuoy 302 from SLC 105.

Returning to FIG. 1A, integrated sonobuoy launch system 102 may include one or more automated, rotary sonobuoy launch systems 106, (e.g., the launcher units referred to above). Each launch system (or rotary sonobuoy launcher unit) 106 may have capacity for holding about 12 sonobuoys ready for deployment, but a launch system 106 with greater or lesser capacity may be found to be practical or advantageous, for example, in the range of 6 to 15 sonobuoys. Each launch system 106 may include a rotary launcher 108 (or "stores launcher") housed under a dome structure 110, also referred to as a "pressure dome" or "pressure shell", that may maintains a pressure difference between the interior and exterior of the pressure shell 110. For example, cabin pressure may be maintained in a cabin 112 exterior to pressure shell 110, while either cabin pressure or outside ambient atmospheric pressure may be maintained interior to pressure shell 110. Thus, integrated sonobuoy launch system 102 may maintain cabin 112 pressure for high altitude launch and deployment of sonobuoys 302. Integrated sonobuoy launch system 102 may also include additional features, such as manual pressurized sonobuoy launch tubes 114 and freefall chutes 116. Such additional features may be used, for example, for backup or to extend capabilities and mission flexibility.

Figure 1A:
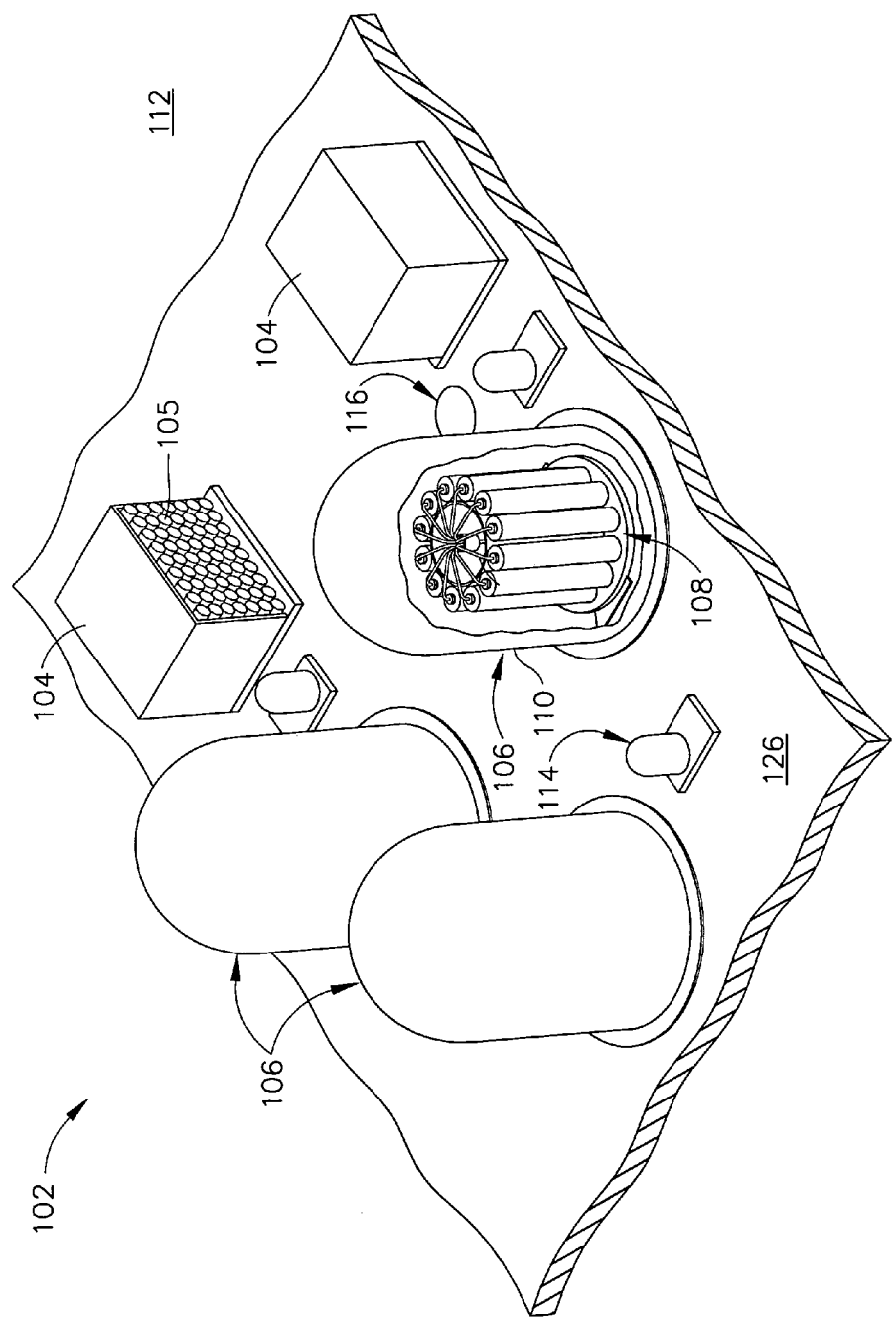
FIG. 1A is an expanded view of a portion of the sonobuoy storage and launch system shown in FIG. 1.
Figure 3:
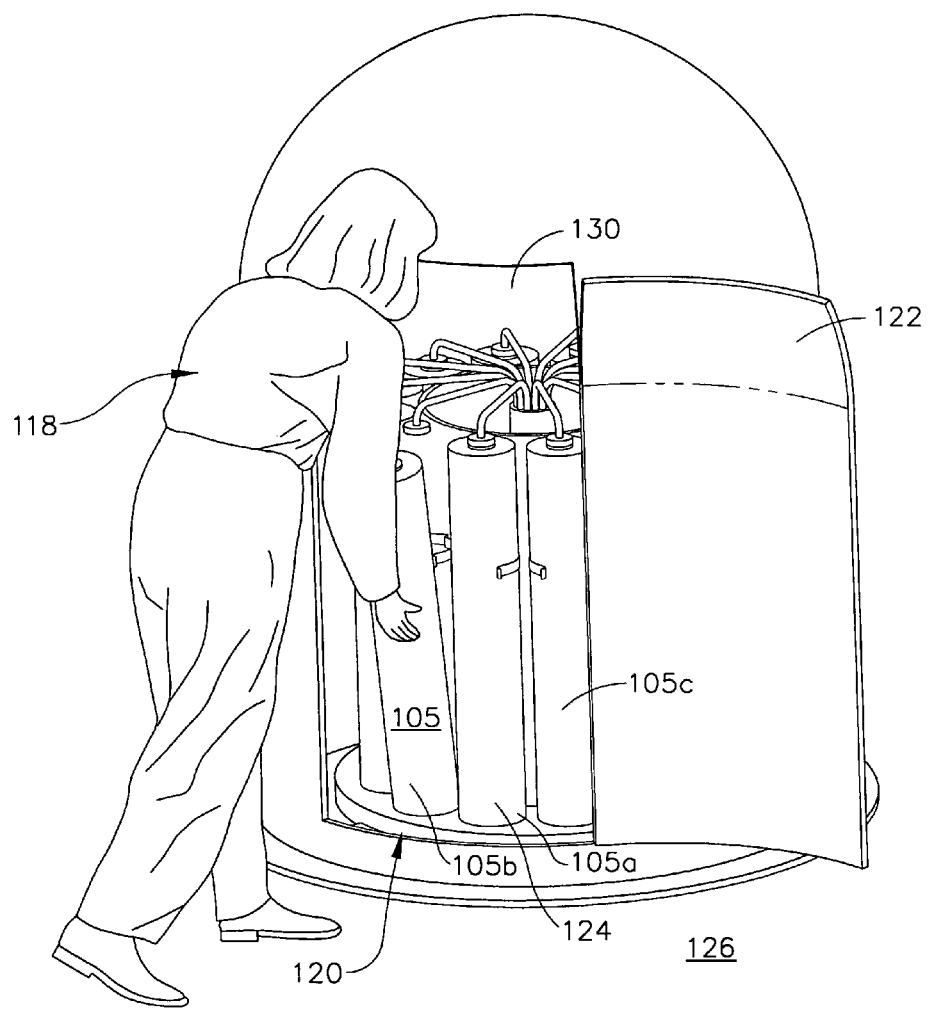
FIG. 3 is a perspective view of personnel loading a sonobuoy in a pressurized sonobuoy launch system in accordance with one embodiment of the present invention.
Figure 7:
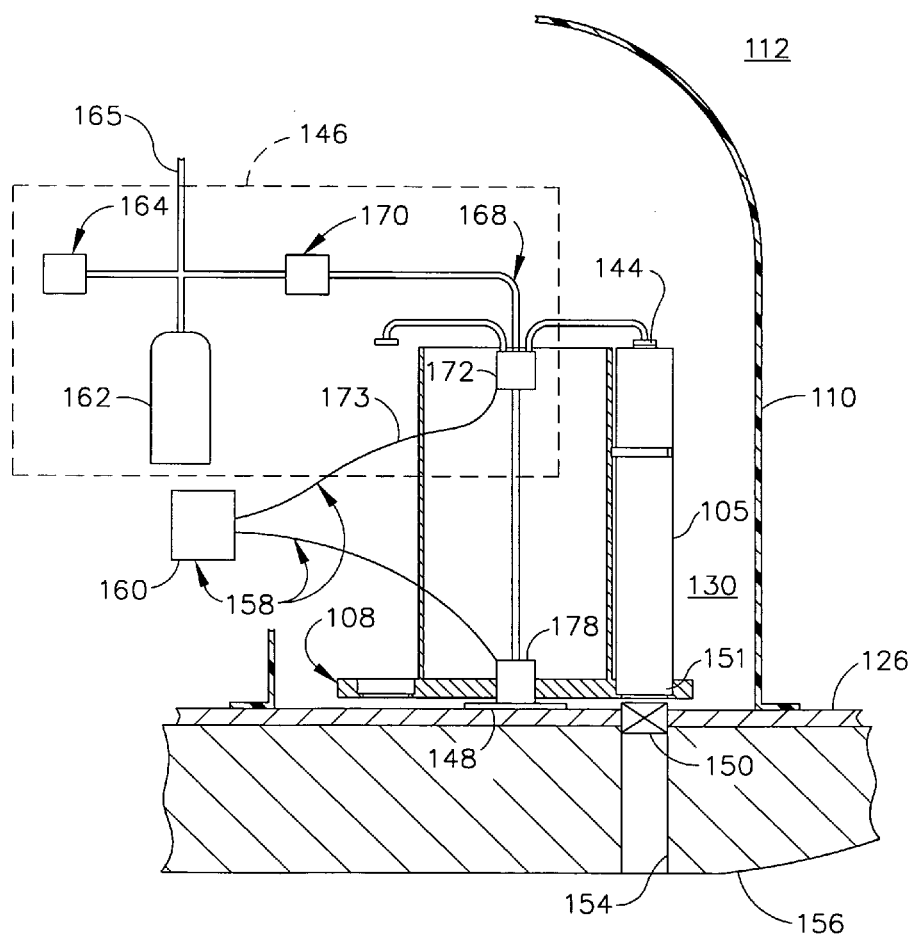
FIG. 7 is a system block diagram of a pressurized sonobuoy launch system combined with a partial cross sectional diagram of a rotary sonobuoy launcher, pressure shell, and aircraft in accordance with one embodiment of the present invention.
Figure 8:
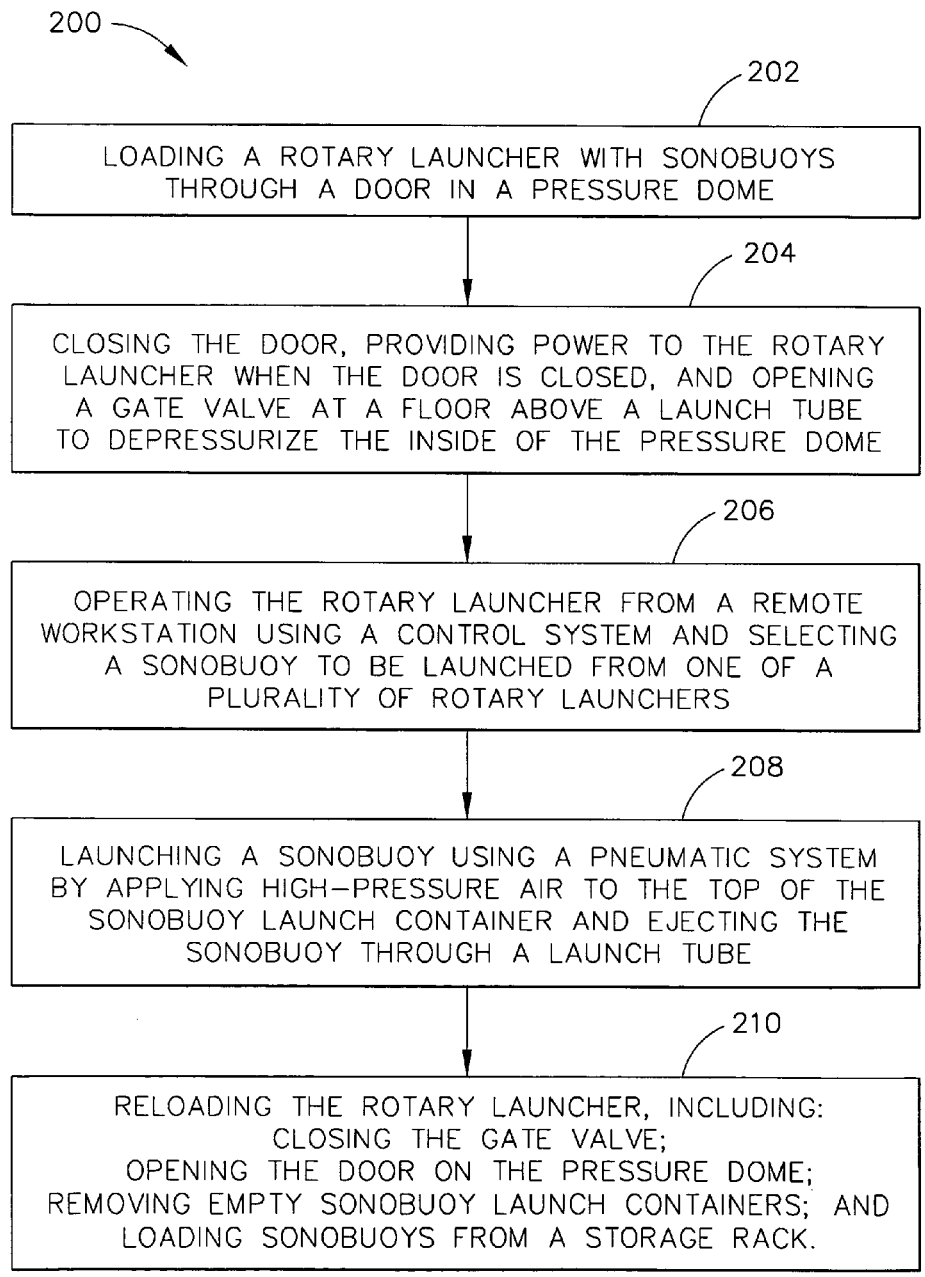
FIG. 8 is a flowchart of a method for launching sonobuoys in accordance with one embodiment of the present invention.

FIG. 3 shows personnel 118—such as flight crew or a sonobuoy system operator—loading a sonobuoy 302 (not shown) in its SLC 105 through a door opening 120 provided by open door 122. As seen in FIG. 3, door 122 may be sized to allow access to a first SLC 105a, which may be located at a loading position 124 and may allow access to additional SLCs 105b and 105c, which may be located, for example to either side of SLC 105a. Door 122 may also provide access for removing empty SLCs 105 after sonobuoys 302 have been launched, or exchanging SLCs 105, or reloading SLCs 105. When closed, door 122 seals against pressure shell 110 to create the pressure boundary described above. As seen in FIGS. 1A, 3, and 7, pressure shell 110 may also be sealed to a floor 126 of cabin 112.

Figure 4:
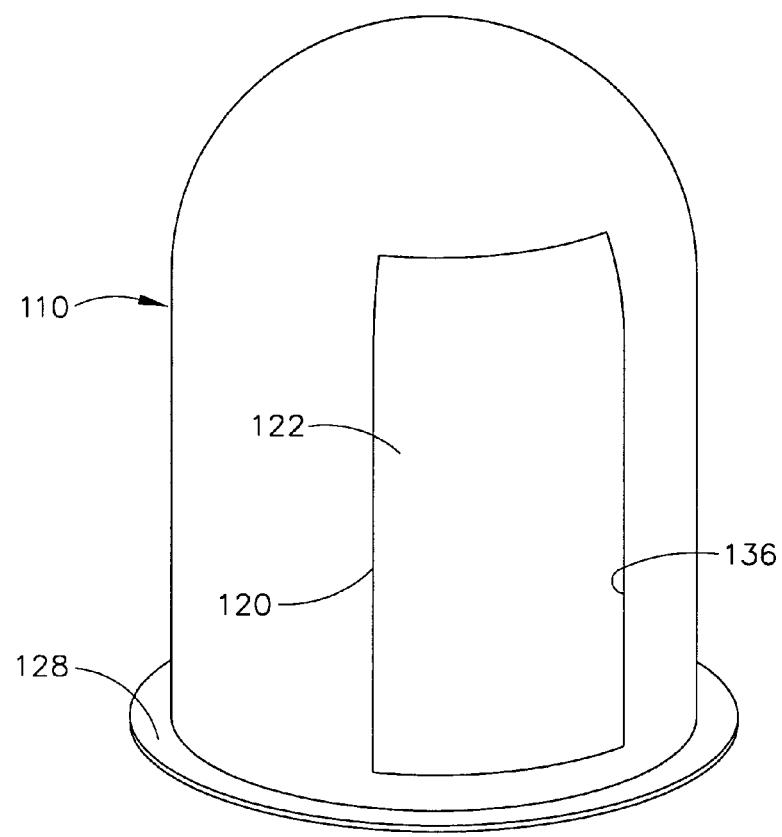
FIG. 4 is an isometric view of a pressure shell for a pressurized sonobuoy launch system in accordance with one embodiment of the present invention.

FIG. 4 shows an outside view of an exemplary pressure shell 110. As shown in FIG. 4, pressure shell 110 may have a mounting flange 128. Mounting flange 128 may aid in securing pressure shell 110 to floor 126 (see FIGS. 1A, 3, and 7) and may aid in forming a seal between pressure shell 110 and floor 126 to create a pressure boundary allowing maintenance of a pressure difference between the exterior of pressure shell 110, e.g., cabin 112, and a cavity 130 (see, e.g., FIGS. 3, 5, 7) inside pressure shell 110, e.g., the interior of pressure shell 110. As shown in FIG. 3, door 122 may be mounted on a hinge or hinges (not shown) so that door 122 may open by swinging from a hinge side 136, shown in FIG. 4.

Figure 5:
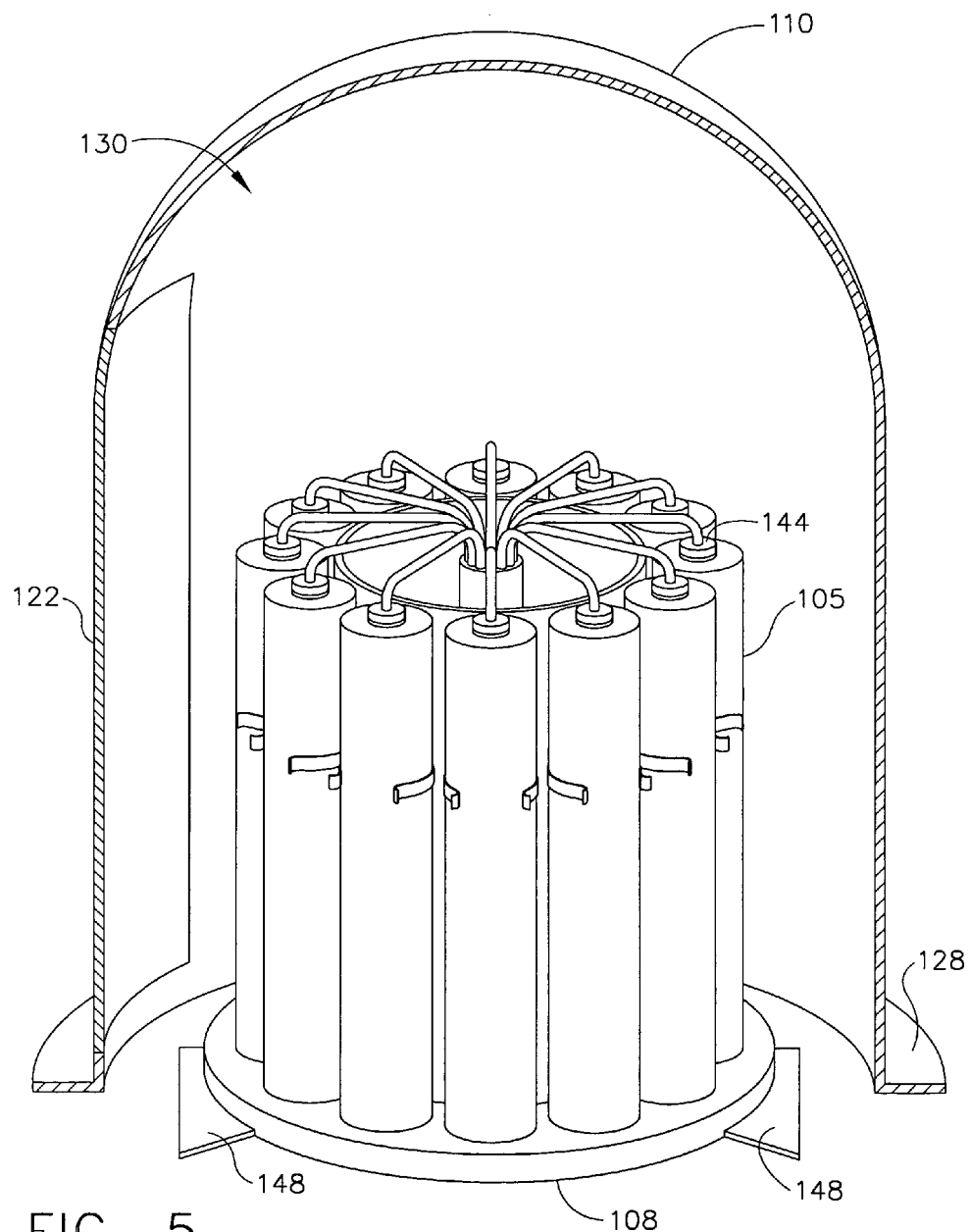
FIG. 5 is a cut-away perspective view of a rotary sonobuoy launcher enclosed in a pressure shell for a pressurized sonobuoy launch system in accordance with one embodiment of the present invention.
Figure 6:
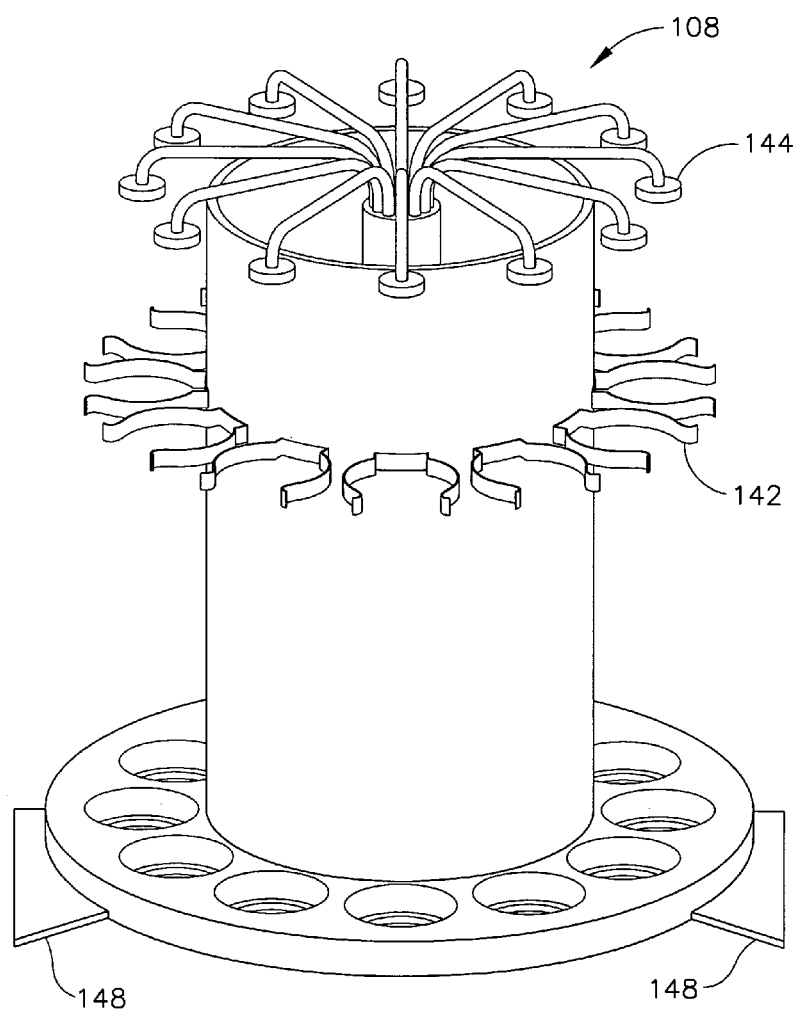
FIG. 6 is a perspective view of a rotary sonobuoy launcher in accordance with one embodiment of the present invention.

FIG. 5 shows the relationship of pressure dome 110 to SLCs 105 when SLCs 105 are loaded in rotary launcher 108 inside pressure dome 110, e.g., within cavity 130. SLCs 105 may be accessed via door 122, shown in a closed position in the cut-away view of FIG. 5. FIG. 6 shows one embodiment of a rotary launcher 108 in more detail. Rotary launcher 108 may include receivers 142 for holding SLCs 105 when loaded into rotary launcher 108. Rotary launcher 108 may include a pneumatic connector 144 for connecting each SLC 105 of a loaded sonobuoy 302 to a pneumatic system—such as pneumatic system 146 shown in FIG. 7—so that sonobuoys 302 can be forcibly ejected pneumatically from rotary launcher 108. Rotary launcher 108 may also include structural supports 148, for example, for securely attaching rotary launcher 108 to the airframe, floor 126, or other structural members of an aircraft, such as jet aircraft 100.

Gate valve 150, shown in FIG. 7, may be disposed in floor 126 under pressure shell 110 and under rotary launcher 108. Gate valve 150 may provide a tubular opening, through which a sonobuoy 302 is able to pass and which connects cavity 130 of pressure shell 110 ultimately to the exterior of aircraft 100. For example, gate valve 150 may be located above a launch tube 154 (see FIG. 7) so that the tubular opening of gate valve 150 is aligned with launch tube 154 leading to the exterior of the aircraft 100 through skin 156 of aircraft 100. Thus, gate valve 150 may be located at launch position 151 of rotary launcher 108 so that when gate valve 150 is open a sonobuoy 302 may be launched through the tubular opening of gate valve 150, through launch tube 154, and through the skin 156 of aircraft 100. When gate valve 150 is closed, it may be sealed so that interior cavity 130 of pressure shell 110 may be maintained at cabin pressure of cabin 112 and so that door 122 may be opened for access to rotary launcher 108 and SLCs 105.

As seen in FIG. 7, integrated sonobuoy launch system 102 may include a pneumatic system 146 and a control system 158. Control system 158 may include a workstation 160, which may be located on aircraft 100 remotely from automated, rotary sonobuoy launch system (launcher unit) 106 and may include control panels, switches, and computer processors to enable human operators to control operation of launcher units 106. Pneumatic system 146 may include a pressure source 162, which may be a gas bottle. Pressure source 162 may be recharged, for example, from an air supply on the ground through ground charging port 164 or may be charged through on-board aircraft charging system 165 for example a bleed air system or auxiliary power unit (APU) (not shown in the figures) while in the air. Pneumatic system 146 may include a pressure regulator 170 installed on pressure feed line 168. Pressure regulator 170 may operate, to ensure control and safety of gas pressure in pressure feed line 168. Pressure feed line 168 may be connected to launch valve 172, which for example, may be a solenoid valve operated by an electrical signal on launch line 173 connected to workstation 160 of control system 158.

When fired by an operator at workstation 160, launch valve 172 may provide pneumatic impulse from the gas in pressure feed line 168 to pneumatic connector 144, and thence to the SLC 105 connected to pneumatic connector 144. The top of the SLC 105 may, thus, be pressurized, for example, with air from pressure source 162. The air pressure may cause the piston 301 inside the SLC 105 to slide, forcing the sonobuoy 302 to the end of the tube of the SLC 105. At the end of the SLC 105 tube a frangible seal 303 breaks, allowing the sonobuoy 302 to slide out of the SLC 105 into a launch tube—such as launch tube 154—which may lead to the bottom and out of the aircraft 100.

Control system 158 may be connected to a drive motor 178 for rotating SLCs 105 in rotary launcher 108 so that any particular selected SLC 105 may be rotated up to launch position 151 and aligned over gate valve 150 and launch tube 154.

In operation, rotary launcher 108 may be covered with a dome structure 110 providing a pressure boundary. For example, with door 122 closed and gate valve 150 open, a pressure transition between inside aircraft cabin pressure and outside ambient air pressure would exist at the pressure boundary. Also, for example, with door 122 open and gate valve 150 closed a pressure transition between inside aircraft cabin pressure and outside ambient air pressure would exist at the gate valve 150. After the SLCs 105 are loaded into the rotary launcher 108 through door 122 in the dome structure 110 and the door 122 is closed, gate valve 150 below the SLCs 105 may be opened, depressurizing the cavity 130 under the dome structure 110. The dome structure 110 allows the cabin 112 to remain pressurized while deploying the sonobuoys 302. When the sonobuoy 302 is to be launched, the rotary launcher 108 may be rotated so that the selected SLC 105 moves into launch position 151 to eject the sonobuoy 302. Launch valve 172 may be opened, pressurizing the top of the SLC 105 and forcibly ejecting the sonobuoy 302 using pneumatic pressure, as described above, imparting sufficient separation velocity to the sonobuoy 302 to effect good clean separation of the sonobuoy 302 from the aircraft 100. To reload, the gate valve 150 may be closed, the door 122 to the pressure dome 110 may be opened, the empty SLC 105 may be removed and a full SLC 105 may be installed, taking only seconds compared with up to a minute for prior art launchers as described above.

A method 200 for deploying stores, e.g., sonobuoys, from aircraft—such as aircraft 100—may include an operation 202 of loading a rotary launcher 108 with sonobuoys 105 through a door 122 in a pressure dome 110 at loading position 124. Method 200 may further include an operation 204 of depressurizing pressure dome 110. Operation 204 may include, for example, closing the door 122, providing power to the rotary launcher 108 when the door 122 is closed, and opening a gate valve 150 at a floor 126 above a launch tube 154 to depressurize the inside (e.g., cavity 130) of the pressure dome 110.

Method 200 may further include an operation 206 of selecting a sonobuoy 105 to be launched from a rotary launcher 108 by selecting a particular sonobuoy 105 from a launcher unit 106, which may be a selected one containing the rotary launcher 108, of a plurality of launcher units 106 in the cabin 112 of aircraft 100. Operation 206 may also include operating the rotary launcher 108 from a remote workstation 160 using a control system 158 to position the selected sonobuoy 105 at a launch position 151.

Method 200 may further include an operation 208 of launching a selected sonobuoy 105. The selected sonobuoy 105 may be launched using a pneumatic system 146. The selected sonobuoy 105 may be launched by firing a launch valve 172 and applying high-pressure gas, e.g., air, through a pneumatic connection 144 to the top of a sonobuoy launch container of the selected sonobuoy 105 and ejecting the sonobuoy 105 through a launch tube 154.

Method 200 may further include an operation 210 of reloading the rotary launcher 108. Operation 210 may include steps of: (1) closing the gate valve 150; (2) opening the door 122 on the pressure dome 110; (3) rotating the sonobuoy to loading position 124 (4) removing empty sonobuoy launch containers 105; and (5) loading sonobuoys in sonobuoy launch containers 105 from a storage rack 104.

It should be understood, of course, that the foregoing relates to exemplary embodiments of the invention and that modifications may be made without departing from the spirit and scope of the invention as set forth in the following claims.

We claim:

1. An aircraft stores launch system comprising:
   a dome structure having a door and that provides a pressure boundary between a cavity inside the dome structure and a cabin outside the dome structure when said door is closed;
   a gate valve connecting said cavity to an exterior outside the aircraft wherein said cavity is depressurized when said door is closed and said gate valve is opened;
   a stores launcher inside said dome structure configured to receive at least one sealed sonobuoy launch container containing a store; and
   a pneumatic system connected to said stores launcher that forces the store from said stores launcher out of the aircraft, wherein the store remains sealed in the sonobuoy launch container until said pneumatic system provides a pressure that forces the store from the sonobuoy launch container, breaking the seal of the sonobuoy launch container and launching the store from the aircraft.

2. The stores launch system of claim 1 wherein said cavity is pressurized when said gate valve is closed.

3. The stores launch system of claim 1 wherein said door is opened when said cavity is pressurized.

4. The stores launch system of claim 1 wherein said door allows access to at least one sonobuoy at a loading position.

5. The stores launch system of claim 1 wherein stores are loaded in said stores launcher when said door is open and said cavity is pressurized so that said stores are loaded without crossing a pressure transition.

6. The stores launch system of claim 1 wherein stores are deployed when said door is closed and said gate valve is open so that said stores are deployed without crossing a pressure transition.

7. The stores launch system of claim 1 wherein stores are deployed pneumatically.

8. The stores launch system of claim 1 wherein said gate valve opens to a launch tube.

9. The stores launch system of claim 1 wherein the stores are sonobuoys.

10. The stores launch system of claim 1 wherein the stores in the sonobuoy launch containers are sonobuoys.

11. A sonobuoy launch system comprising:
   a pressure dome having a door wherein when said door is closed said pressure dome maintains a pressure difference between a cabin pressure outside said pressure dome and an ambient pressure inside said pressure dome;
   a gate valve in a floor under said pressure dome that, when said gate valve is closed, allows said pressure difference to be reduced and allows said cabin pressure to be maintained inside said pressure dome so that said door can be opened;
   a rotary launcher inside the pressure dome that rotates a sonobuoy launch container receiver into a loading position and into which rotary launcher a sonobuoy in a sealed sonobuoy launch container is loaded while said gate valve is closed and said door is open; and
   a pneumatic system connected to said rotary launcher and that forces the sonobuoy from its sealed sonobuoy launch container when the gate valve is open and the door is closed.

12. The sonobuoy launch system of claim 11, further comprising a launch tube located at the launch position, and through which said sonobuoy is launched.

13. The sonobuoy launch system of claim 11, wherein:
   said gate valve is located at said launch position and above said launch tube; and
   when the sonobuoy is launched, said gate valve is open.

14. The sonobuoy launch system of claim 11 further comprising a pneumatic launch valve that communicates with an air pressure source and connects to the sealed sonobuoy launch container located at the launch position.

15. The sonobuoy launch system of claim 11 wherein, when the sonobuoy is launched, a launch valve is opened, pressurizing the top of the sealed sonobuoy launch container of the sonobuoy located at the launch position, so that the sonobuoy breaks the seal and is forcibly ejected from the launch tube.

16. An automated, rotary sonobuoy launch system comprising:
   a pressure shell having a door and that provides a pressure boundary between a cavity inside the pressure shell and a cabin of an aircraft outside the pressure shell wherein, when said door is closed, said pressure shell maintains a pressure difference between a cabin pressure outside said pressure shell and an ambient pressure inside said pressure shell;
   a gate valve in a floor under said pressure shell and connecting said cavity to the exterior of the aircraft wherein:
      when said door is closed and said gate valve is opened said cavity is depressurized to said ambient pressure so that said pressure difference is present across said pressure shell but not across said gate valve; and
      when said gate valve is closed allows said cavity to be pressurized to said cabin pressure so that said pressure difference is reduced and said door can be opened; and
   a rotary launcher inside said pressure shell that rotates a sonobuoy launch container receiver into a loading position for installation of a sealed sonobuoy launch container containing a sonobuoy into said rotary launcher and into a launch position above said gate valve for launching the sonobuoy from its sealed sonobuoy launch container.

17. The automated, rotary sonobuoy launch system of claim 16, wherein said gate valve is located above a launch tube and said gate valve is opened preparatory to a sonobuoy being launched through said gate valve and said launch tube.

18. The automated, rotary sonobuoy launch system of claim 16, further comprising a pneumatic system for launching a sonobuoy located at said launch position including:
   a gas bottle, rechargeable pressure source; and
   a launch valve connected to said pressure source, said launch valve having an outlet that connects to the sealed sonobuoy launch container at said launch position, wherein:
   when the sonobuoy is launched, the launch valve is opened, pressurizing the top of the sealed sonobuoy launch container of the sonobuoy located at the launch position so that the sonobuoy launch container seal is broken and the sonobuoy is forcibly ejected from the sonobuoy launch container.

19. The automated, rotary sonobuoy launch system of claim 16, further comprising a control system that includes a motor, wherein said motor is connected to provide positioning of a selected sonobuoy at the launch position.

20. The automated, rotary sonobuoy launch system of claim 16, further comprising a control system that interacts with a launch valve of a pneumatic system and ensures sonobuoy launch only when a sonobuoy is positioned at the launch position and said gate valve is open.

21. A jet aircraft with integrated rotary sonobuoy launch system comprising:
   a cabin;
   storage racks in said cabin that store a plurality of sonobuoys in sonobuoy launch containers;
   at least one automated, rotary sonobuoy launcher unit in said cabin, wherein:
      said automated, rotary sonobuoy launcher unit has a door that allows loading of sonobuoys in sealed sonobuoy launch containers from said plurality of sonobuoys in sonobuoy launch containers in said storage racks;
      said automated, rotary sonobuoy launcher unit includes:
      a pressure shell that when said door is closed provides a pressure boundary between pressure in a cavity inside the pressure shell and a cabin pressure outside the pressure shell;
      a gate valve in a floor under said pressure shell and connecting said cavity to an exterior of the aircraft wherein: when said door is closed and said gate valve is opened said cavity is depressurized to ambient pressure outside the aircraft so that a sonobuoy can be launched; and when said gate valve is closed said cavity can be pressurized to said cabin pressure so that said door can be opened and said sonobuoys from said plurality of sonobuoys can be loaded; and
      a rotary launcher inside said pressure shell that rotates a sealed sonobuoy launch container containing a sonobuoy into a launch position above said gate valve and a launch tube leading to the exterior of the aircraft.

22. The jet aircraft of claim 21, further including a pneumatic system connected to said automated, rotary sonobuoy launcher unit and having a pressure source connected to a launch valve having an outlet that connects to the sealed sonobuoy launch container at said launch position so that said sonobuoy located at said launch position is pneumatically ejected from its sealed sonobuoy launch container through said launch tube when said launch valve is activated.

23. The jet aircraft of claim 21, further including an electronic control system that activates said launch valve.

24. A modified transport aircraft comprising:
   a cabin;
   storage racks in said cabin that store a plurality of sonobuoys in sealed sonobuoy launch containers;
   a plurality of automated, rotary sonobuoy launcher units in said cabin, wherein:
      each of said automated, rotary sonobuoy launcher units has a door that allows loading of sonobuoys in sealed sonobuoy launch containers from said plurality of sonobuoys in sealed sonobuoy launch containers in said storage racks;
      each of said automated, rotary sonobuoy launcher units includes:
         a pressure shell that when said door is closed provides a pressure boundary between pressure in a cavity inside the pressure shell and a cabin pressure outside the pressure shell;
         a gate valve in a floor under said pressure shell and connecting said cavity to an exterior of the aircraft wherein: when said door is closed and said gate valve is opened said cavity is depressurized to ambient pressure outside the aircraft so that a sonobuoy can be launched; and when said gate valve is closed said cavity can be pressurized to said cabin pressure so that said door can be opened and said sonobuoys from said plurality of sonobuoys can be loaded;
         a rotary launcher inside said pressure shell that rotates a sealed sonobuoy launch container containing a sonobuoy into a launch position above said gate valve and a launch tube leading to the exterior of the aircraft; and
   a pneumatic system and control system connected to said plurality of automated, rotary sonobuoy launcher units so that a sonobuoy in its sealed sonobuoy launch container from each of said plurality of automated, rotary sonobuoy launcher units can be individually and selectively launched directly from its sealed sonobuoy launch container.

25. A method of launching sonobuoys, comprising the operations of:
   loading a rotary launcher with sonobuoys in their respective sealed sonobuoy launch containers through a door in a pressure dome;
   closing said door and opening a gate valve at a floor above a launch tube to depressurize the inside of said pressure dome; and
   launching a sonobuoy from its sealed sonobuoy launch container, in the process breaking a frangible seal of the sonobuoy launch container, using a pneumatic system.

26. The method of launching sonobuoys of claim 25, further comprising an operation of providing power to the rotary launcher when the door is closed.

27. The method of launching sonobuoys of claim 25, further comprising an operation of operating the rotary launcher from a remote workstation using a control system.

28. The method of launching sonobuoys of claim 25, further comprising an operation of selecting a sonobuoy to be launched from one of a plurality of rotary launchers.

29. The method of launching sonobuoys of claim 25, wherein said launching operation includes launching through a launch tube using pneumatics; by applying high-pressure air to the top of the sealed sonobuoy launch container.

30. The method of launching sonobuoys of claim 25, further comprising an operation of reloading the rotary launcher, including the steps of:
   closing the gate valve;
   opening the door on the pressure dome;
   removing empty sonobuoy launch containers; and
   loading sealed sonobuoy launch containers containing sonobuoys from a storage rack.

* * * * *